(12) United States Patent
Sekine et al.

(10) Patent No.: US 10,585,010 B2
(45) Date of Patent: Mar. 10, 2020

(54) PRESSURE SENSOR HAVING A TEMPERATURE CONTROL UNIT AND A TEMPERATURE DIFFERENCE CALCULATION UNIT

(71) Applicant: AZBIL CORPORATION, Chiyoda-ku (JP)

(72) Inventors: Masashi Sekine, Chiyoda-ku (JP);
Takuya Ishihara, Chiyoda-ku (JP);
Masaru Soeda, Chiyoda-ku (JP);
Hidenobu Tochigi, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 163 days.

(21) Appl. No.: 15/915,367

(22) Filed: Mar. 8, 2018

(65) Prior Publication Data
US 2018/0259409 A1    Sep. 13, 2018

(30) Foreign Application Priority Data
Mar. 9, 2017  (JP) .................... 2017-044554

(51) Int. Cl.
*G01L 9/12* (2006.01)
*G01L 9/00* (2006.01)

(52) U.S. Cl.
CPC ............ *G01L 9/125* (2013.01); *G01L 9/0072* (2013.01)

(58) Field of Classification Search
None
See application file for complete search history.

(56) References Cited

U.S. PATENT DOCUMENTS 6,701,790 B2 * 3/2004 Fortner .................... G01K 1/20
374/143
8,763,467 B2 * 7/2014 Ishihara ................ G01L 9/0072
73/708

(Continued)

FOREIGN PATENT DOCUMENTS

JP    2006-003234         1/2006
JP    2009-244149 A      10/2009

(Continued)

OTHER PUBLICATIONS

Korean Office Action dated Feb. 14, 2019 in Korean Patent Application No. 10-2018-0025626 (submitting English translation only), citing documents AO and AP therein. 2 pages.

(Continued)

*Primary Examiner* — Natalie Huls
*Assistant Examiner* — Jermaine L Jenkins
(74) *Attorney, Agent, or Firm* — Oblon, McClelland, Maier & Neustadt, L.L.P.

(57) ABSTRACT

A temperature difference calculation unit determines a temperature difference between a temperature measured by a first temperature measurement mechanism and a temperature measured by a second temperature measurement mechanism. The first temperature measurement mechanism is disposed on an outer wall surface of an inner container at a position corresponding to an element-arrangement-side space in the inner container. The second temperature measurement mechanism is disposed on an outer peripheral surface of a heater. The heater is disposed outside an outer container that accommodates the inner container and positioned on a wall surface of the outer container.

3 Claims, 4 Drawing Sheets

(56) References Cited

U.S. PATENT DOCUMENTS 10,130,123 B2 * 11/2018 Hatton ................. G01L 9/0072
2012/0247216 A1     10/2012 Ishihara et al.

FOREIGN PATENT DOCUMENTS

JP        2014-109484      6/2014
KR    10-2012-0111989 A    10/2012

OTHER PUBLICATIONS

Shunji Ichida et al., SPS300 the development of the SPS300 intelligent pressure sensor, Savemation Review, vol. 9, No. 1, pp. 8-14, 1991).

* cited by examiner

PRESSURE SENSOR HAVING A TEMPERATURE CONTROL UNIT AND A TEMPERATURE DIFFERENCE CALCULATION UNIT

CROSS-REFERENCE TO RELATED APPLICATIONS

The present application is based on and claims priority to Japanese Application No. 2017-044554, filed Mar. 9, 2017, the entire contents of which are incorporated herein by reference.

BACKGROUND

1. Field

The present disclosure relates to pressure sensors, and more specifically to a pressure sensor equipped with a detection device including a diaphragm displaceable upon receipt of pressure from fluid.

2. Description of the Related Art

In a pressure sensor such as a capacitance diaphragm gauge, a detection device including a diaphragm is attached to a pipe or the like in which a measurement target gas flows, converts an amount of deflection, or a displacement, of the diaphragm subjected to pressure into a capacitance value, and outputs a pressure value obtained from the capacitance value. Pressure sensors of this type are less dependent on the gas type and are thus widely used in industrial applications such as semiconductor facilities (see Japanese Unexamined Patent Application Publication Nos. 2006-003234 and 2014-109484).

The detection device of the pressure sensor, such as a diaphragm gauge, described above includes, as illustrated in FIG. 6, a diaphragm 302 and a base 301. The diaphragm 302 receives pressure from a measurement target. The base 301 has a recess at substantially the center thereof in plan view, and includes supporting portions 301a that support the diaphragm 302. The diaphragm 302 and the base 301 form a capacitance chamber 303. The diaphragm 302, which is supported by the supporting portions 301a, has a movable area 302a. The movable area 302a is spaced apart from the base 301 and is displaceable toward the base 301. The diaphragm 302 and the base 301 are composed of an insulating material such as sapphire.

The detection device of the pressure sensor further includes a movable electrode 304 and a fixed electrode 305. The movable electrode 304 is disposed in the movable area 302a of the diaphragm 302, and the fixed electrode 305 is disposed on the base 301 and faces the movable electrode 304. The detection device of the pressure sensor further includes a movable reference electrode 306 and a fixed reference electrode 307. The movable reference electrode 306 is disposed in the movable area 302a of the diaphragm 302 so as to surround the movable electrode 304, and the fixed reference electrode 307 is disposed on the base 301 so as to surround the fixed electrode 305 and faces the movable reference electrode 306.

The detection device of the pressure sensor described above is required to be resistant to corrosion caused by a gas used in a device to which the pressure sensor is attached and is also required to be resistant to by-products generated during processes such as film deposition. In the film deposition process, by-products generated during the process may be deposited on locations exposed to source gas, such as the inner wall of a film deposition chamber, the inner wall of a pipe, the inside of a vacuum pump, and a diaphragm that is a pressure-receiving portion of the pressure sensor. As illustrated in FIG. 6, for example, a by-product 321 is deposited on the diaphragm 302.

For example, atomic layer deposition (ALD) methods, which are used to form gate insulating films and the like, due to their characteristics, cause deposition of by-products on various locations exposed to source gas. To prevent the deposition of by-products, for example, portions of a film deposition apparatus that are prone to deposition of by-products are heated to about 200° C., for example, during the film deposition operation or the like.

For example, on the pressure sensor side, the detection device is heated to suppress the deposition of a by-product. On the film deposition apparatus side, a heater provided for a pipe unit through which pressure is introduced into the diaphragm of the pressure sensor heats the pipe unit in a similar way.

A pressure sensor has also sensitivity to temperature changes (temperature characteristics) (see ICHIDA et al., "SPS300 interijento atsuryoku sensa no kaihatsu (The development of the SPS300 intelligent pressure sensor)", Savemation Review, vol. 9, no. 1, pp. 8-14, 1991). Thus, typically, the temperature characteristics of the pressure sensor are evaluated after the assembling of the pressure sensor, and a measurement circuit that corrects the output of the pressure sensor on the basis of a temperature to which the detection device is heated is adjusted to reduce the effect of temperature changes on the pressure sensor before shipment.

However, even when the output of the pressure sensor is corrected on the basis of a temperature to which the detection device is heated, a deviation of the measured value to be output is observed in some cases. The deviation is estimated to be caused by a change in heat transmission from the pipe unit due to some influence which results in the actual temperature of the detection device becoming different from a measured temperature for controlling the heater for heating the detection device.

In the control of the temperature to which the detection device is heated, feedback control is performed in which the temperature of the surroundings of the detection device is measured and the flow of current through the heater is controlled by using the measured temperature. The output of the pressure sensor is corrected on the basis of the temperature value controlled in the way described above.

If heat transmitted through the pipe unit changes, the temperature of the detection device immediately changes. In contrast, the temperature of the surroundings of the detection device, which is measured for feedback control, changes with a delay after heat changes. Thus, when a change occurs in the transmission of heat from the pipe unit for introducing pressure into the diaphragm, the temperature measured for control does not follow the change. In this state, the output of the pressure sensor is corrected by using a temperature different from the actual temperature of the detection device. As a result, the deviation of the measured value described above is considered to occur. Accordingly, the deviation of the measured value output from the pressure sensor is considered to be caused by fluctuations of heat transmitted to the detection device of the pressure sensor from the pipe for introducing the pressure of the measurement target.

SUMMARY

Accordingly, it is an object of the present disclosure to enable the detection of fluctuations of heat transmitted to a detection device of a pressure sensor from a pipe for introducing the pressure of a measurement target.

A pressure sensor according to an aspect of the present disclosure includes a detection device including a diaphragm displaceable upon receipt of pressure from a measurement target, the detection device being configured to convert a displacement of the diaphragm into a change in another physical quantity, a pressure value output unit configured to convert the change in the other physical quantity obtained from the displacement of the diaphragm into a pressure value and output the pressure value, an inner container that accommodates the detection device, an outer container that accommodates the inner container, a pressure introduction pipe connected to the inner container and configured to introduce the pressure of the measurement target into the inner container, a partition wall disposed in the inner container, the partition wall separating an internal space of the inner container into a pressure-detection-side space and an element-arrangement-side space opposite the pressure-detection-side space, the pressure-detection-side space being a space into which the pressure of the measurement target is introduced through the pressure introduction pipe, the element-arrangement-side space being a space in which the detection device is disposed, the partition wall having the detection device joined to a surface thereof in the element-arrangement-side space, the partition wall having a pressure introduction hole through which pressure in the pressure-detection-side space is introduced to the diaphragm of the detection device, a first temperature measurement mechanism disposed on an outer wall surface of the inner container at a position corresponding to the element-arrangement-side space, a heating mechanism disposed outside the outer container and positioned on a wall surface of the outer container, the heating mechanism being configured to heat an inside of the outer container, a temperature control unit configured to control an operation of the heating mechanism such that a first temperature value measured by the first temperature measurement mechanism close to a set temperature, a second temperature measurement mechanism configured to measure a temperature of the heating mechanism, a temperature difference calculation unit configured to determine a temperature difference between the first temperature value measured by the first temperature measurement mechanism and a second temperature value measured by the second temperature measurement mechanism, and an alert output unit configured to issue an alert when the temperature difference calculated by the temperature difference calculation unit falls outside a set range.

In the pressure sensor, the detection device may further include a base that supports the diaphragm with a space therebetween, a first electrode disposed on the diaphragm, and a second electrode disposed on the base and facing the first electrode. The pressure value output unit may convert a capacitance change between the first electrode and the second electrode due to a displacement of the diaphragm into a pressure value and may output the pressure value.

In the pressure sensor, the diaphragm may include a capacitance chamber opposite a pressure-receiving portion that receives the pressure from the measurement target, the capacitance chamber being in a vacuum.

As described above, according to an aspect of the present disclosure, the advantage of enabling the detection of fluctuations of heat transmitted to a detection device of a pressure sensor from a pipe (pressure introduction pipe) for introducing the pressure of a measurement target is achievable.

DETAILED DESCRIPTION

Figure 1:
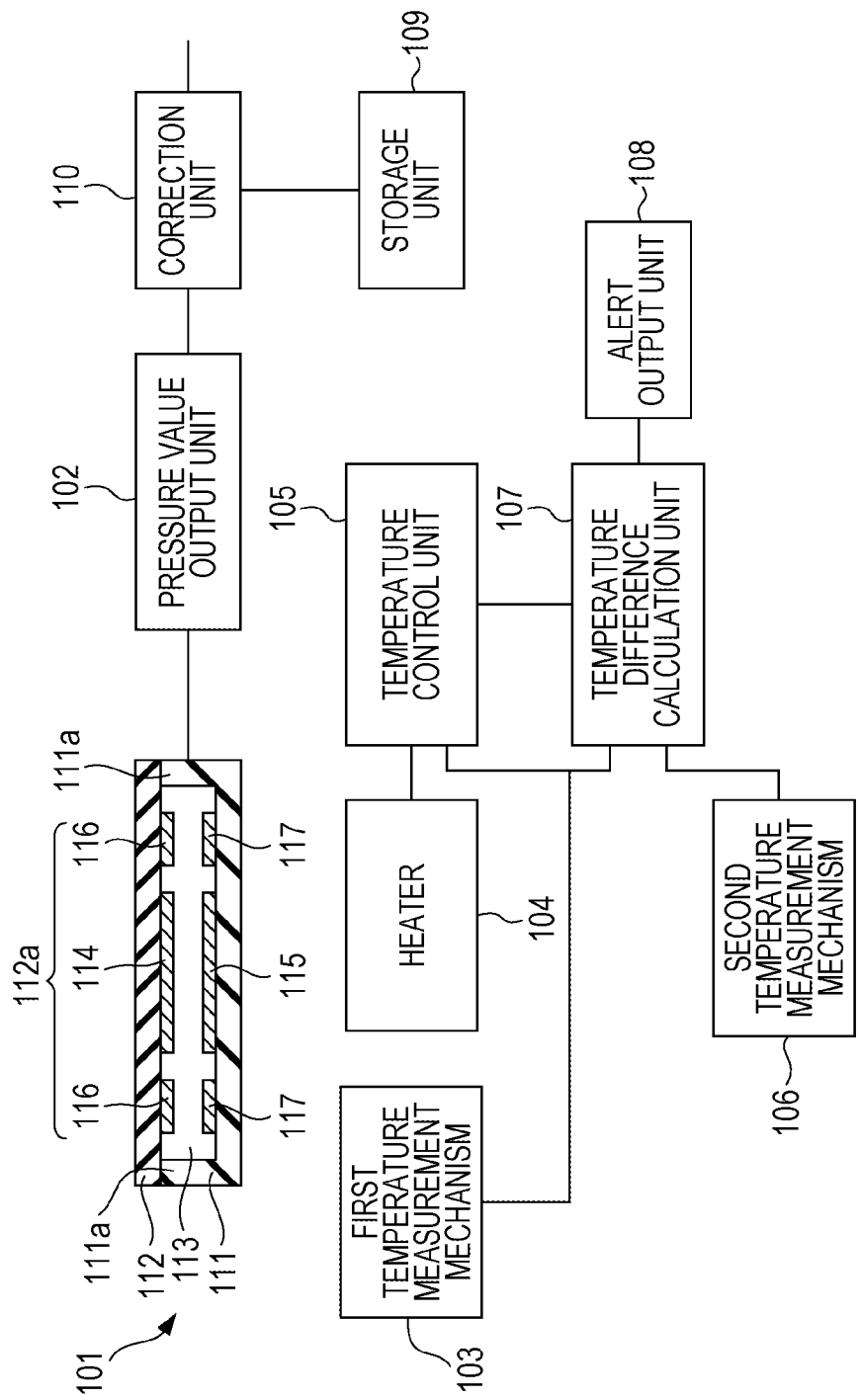
FIG. 1 is a configuration diagram illustrating a configuration of a pressure sensor according to an embodiment of the present disclosure.
Figure 2:
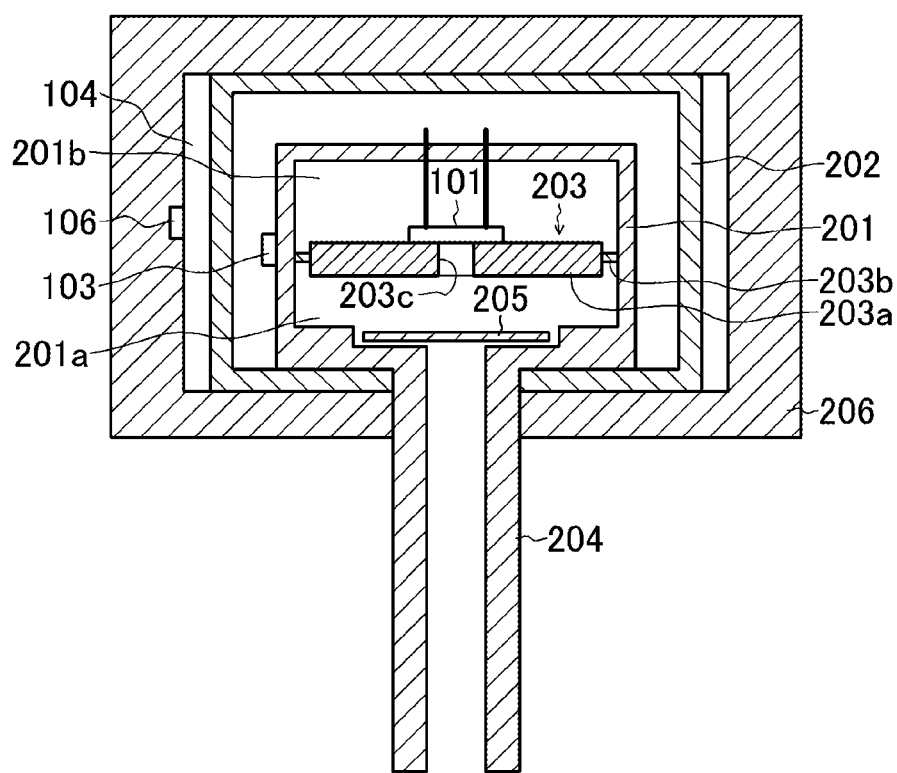
FIG. 2 is a cross-sectional view schematically illustrating the configuration of the pressure sensor according to the embodiment of the present disclosure.

An embodiment of the present disclosure will be described hereinafter with reference to FIGS. 1 and 2. FIG. 1 is a configuration diagram illustrating a configuration of a pressure sensor according to an embodiment of the present disclosure. FIG. 2 is a cross-sectional view schematically illustrating the configuration of the pressure sensor according to the embodiment of the present disclosure.

The pressure sensor includes a detection device (sensor chip) 101, a pressure value output unit 102, a first temperature measurement mechanism 103, a heater (a heating mechanism) 104, a temperature control unit 105, a second temperature measurement mechanism 106, a temperature difference calculation unit 107, and an alert output unit 108. The pressure sensor further includes a storage unit 109 and a correction unit 110.

In an embodiment, the sensor chip 101 is of a well-known capacitance type. The sensor chip 101 includes a base 111, a diaphragm 112, a movable electrode (a first electrode) 114, and a fixed electrode (a second electrode) 115. The sensor chip 101 converts a displacement of the diaphragm 112 into a change in another physical quantity (capacitance).

The base 111 and the diaphragm 112 are each composed of an insulating material resistant to heat and corrosion, such as sapphire or alumina ceramic. The diaphragm 112, which serves as a pressure-receiving portion, is supported by supporting portions 111a of the base 111. The base 111 has a recess at substantially the center thereof in plan view. The diaphragm 112 is displaceable toward the base 111 in a movable area 112a within an inner region defined by the supporting portions 111a. The movable area 112a is substantially circular in plan view, for example.

A capacitance chamber 113 is provided in the movable area 112a between the diaphragm 112 and the base 111. The capacitance chamber 113 is in a vacuum and serves as a reference vacuum chamber. In this case, the pressure sensor according to the embodiment is a vacuum gauge for measuring the pressure (vacuum level) in the environment whose pressure is reduced below the atmospheric pressure.

The movable electrode 114 is disposed in the movable area 112a of the diaphragm 112 within the capacitance chamber 113. The fixed electrode 115 is disposed on the base 111 within the capacitance chamber 113 so as to face the movable electrode 114. The sensor chip 101 includes a movable reference electrode 116 and a fixed reference electrode 117. The movable reference electrode 116 is disposed in the movable area 112a of the diaphragm 112 within the capacitance chamber 113 so as to surround the movable electrode 114. The fixed reference electrode 117 is disposed on the base 111 within the capacitance chamber 113 so as to surround the fixed electrode 115. The movable reference electrode 116 and the fixed reference electrode 117 face each other.

The pressure value output unit 102 converts a change in the other physical quantity described above, which is caused by a displacement of the diaphragm 112, into a pressure value and outputs the pressure value. For example, the pressure value output unit 102 converts a capacitance change caused by a displacement of the diaphragm 112 into a pressure value by using set sensor sensitivity and outputs the pressure value.

The storage unit 109 stores temperature characteristics indicating changes in pressure value with respect to temperature changes within a predetermined temperature range of the sensor chip 101. For example, when the sensor chip 101 is used at a set temperature of 100° C., temperature characteristics of pressure values at a temperature range of 90° C. to 110° C. are stored in the storage unit 109. The correction unit 110 corrects a pressure value to be output from the pressure value output unit 102 by using the temperature characteristics stored in the storage unit 109 on the basis of the temperature of the sensor chip 101 that is measured by the first temperature measurement mechanism 103.

The pressure sensor further includes an inner container 201 and an outer container 202. The inner container 201 accommodates the sensor chip 101. The outer container 202 accommodates the inner container 201. Each of the inner container 201 and the outer container 202 has a substantially hollow cylindrical shape, for example. The inner container 201 includes a partition wall 203. The partition wall 203 separates the internal space of the inner container 201 into a pressure-detection-side space 201a and an element-arrangement-side space 201b in which the sensor chip 101 is disposed. The sensor chip 101 is fixed (joined) to and supported by the side of the partition wall 203 that corresponds to the element-arrangement-side space 201b.

The partition wall 203 is constituted by a mount plate 203a and supporting partition walls 203b. The sensor chip 101 is fixed to the mount plate 203a. The supporting partition walls 203b support the mount plate 203a against inner side surfaces of the inner container 201. The mount plate 203a of the partition wall 203 has a pressure introduction hole 203c through which the pressure in the pressure-detection-side space 201a is introduced to the diaphragm 112 of the sensor chip 101.

A pressure introduction pipe 204 is connected to the inner container 201. The pressure introduction pipe 204 allows the pressure-detection-side space 201a of the inner container 201 and the inside of a device whose pressure is to be measured to communicate. Through the pressure introduction pipe 204, the pressure of the measurement target is introduced into the pressure-detection-side space 201a of the inner container 201. A baffle plate 205 is disposed between an inward open end of the pressure introduction pipe 204 and the pressure introduction hole 203c. The baffle plate 205 allows the fluid introduced through the pressure introduction pipe 204 to bypass without directly reaching the sensor chip 101.

The first temperature measurement mechanism 103 measures the temperature of the element-arrangement-side space 201b of the inner container 201. The first temperature measurement mechanism 103 is disposed on an outer wall surface of the inner container 201 at a position corresponding to the element-arrangement-side space 201b. The first temperature measurement mechanism 103 measures the temperature of the inner container 201, which is used as the temperature of the sensor chip 101.

The heater (electric heating device) 104 is disposed outside the outer container 202 and positioned on an outer wall surface of the outer container 202. For example, the heater 104 is disposed so as to wrap around an outer circumferential surface of the outer container 202 having a substantially hollow cylindrical shape. The heater 104 heats the inside of the outer container 202.

As described above, the second temperature measurement mechanism 106 is disposed in contact with an outer peripheral surface of the heater 104 disposed on the outer container 202. The second temperature measurement mechanism 106 measures the temperature of the heater 104. The second temperature measurement mechanism 106 is disposed to, for example, monitor the operation of the heater 104 to prevent excessive temperature rise or the like. The outer container 202 on which the heater 104 is disposed is covered by a thermal insulating member 206.

As described above, the pressure-detection-side space 201a of the inner container 201, which is defined by the partition wall 203, is a space into which, for example, a measurement target fluid is introduced. In contrast, the element-arrangement-side space 201b is under vacuum.

The capacitance chamber 113 of the sensor chip 101 is ideally airtight under vacuum. However, it is difficult to manufacture the sensor chip 101 in such a manner that the capacitance chamber 113 of the sensor chip 101, which is small, is made airtight under vacuum. To address this difficulty, the sensor chip 101 has a communication port through which the capacitance chamber 113 and the outside communicate. In the process of manufacturing the pressure sensor, the element-arrangement-side space 201b in which the sensor chip 101 is disposed is evacuated under vacuum, thereby making the capacitance chamber 113 under vacuum.

When the outer container 202 having the configuration described above is heated with the heater 104, the heat of the heater 104 is transmitted through a layer of air inside the outer container 202 whose pressure is set to the atmospheric pressure, and travels to heat the inner container 201. It is conceivable that the inner container 201 be provided with a heater to directly heat the inner container 201. However, when the inner container 201 is directly heated, it is difficult to uniformly heat the entirety of the inner container 201. This difficulty is observed during actual manufacturing. In the embodiment, in contrast, the outer container 202 is disposed to provide a layer of gas (air) between the inner container 201 and the outer container 202. The outer container 202 is heated in this condition, thereby making it possible to uniformly heat the entirety of the inner container 201.

In the inner container 201 heated in the way described above, the deposition of a by-product in the pressure-detection-side space 201a is reduced. In the heated inner container 201, furthermore, the sensor chip 101 disposed in the element-arrangement-side space 201b is also heated. In the heated sensor chip 101, the deposition of a by-product on the diaphragm 112 is reduced.

The first temperature measurement mechanism 103, which is disposed on the outer side surface of the inner container 201 at a position corresponding to the element-arrangement-side space 201b, measures the temperature of the inside of the inner container 201. On the basis of a first temperature value measured by the first temperature measurement mechanism 103 in the way described above, the temperature control unit 105 controls the operation of the heater 104 to heat the sensor chip 101 to a set temperature.

In the embodiment of the present disclosure, in the configuration described above, the temperature difference calculation unit 107 determines a temperature difference between the first temperature value measured by the first temperature measurement mechanism 103 and a second temperature value measured by the second temperature measurement mechanism 106. If the temperature difference calculated by the temperature difference calculation unit 107 falls outside a set range, the alert output unit 108 issues an alert indicating the occurrence of fluctuations of heat transmitted through the pressure introduction pipe 204.

In an embodiment of the present disclosure, when the temperature difference calculated by the temperature difference calculation unit 107 falls outside a set range, it is determined that fluctuations of heat transmitted to the sensor chip 101 from the outside are occurring. For example, when the temperature difference calculated by the temperature difference calculation unit 107 becomes greater than the set range, this can be estimated to represent less heat transmission from the pressure introduction pipe 204. In contrast, when the temperature difference calculated by the temperature difference calculation unit 107 becomes less than the set range, this can be estimated to represent more heat transmission from the pressure introduction pipe 204.

The change in heat transmission described above causes a slight change in temperature distribution over the area of the pressure-detection-side space 201a, resulting in a change in the output of the pressure value output unit 102 due to the temperature characteristics of the sensor chip 101. If the temperature measurement result of the first temperature measurement mechanism 103 is not accorded with the temperature change, the correction unit 110 is not induced to perform a correction operation, which affects the measured value to be output.

An experiment was performed in which the temperature of the pressure introduction pipe 204 was changed and the first temperature measurement mechanism 103 and the second temperature measurement mechanism 106 performed temperature measurement operations. In this experiment, a change in zero point in accordance with a change in the temperature of the pressure introduction pipe 204 was observed.

In the experiment, a pressure sensor (vacuum gauge) with a measurement range of 10 Pa was used. The temperature of self-heating with the heater 104 was set to 150° C. In the pressure sensor, accordingly, the temperature control unit 105 performs feedback control based on a temperature measurement result obtained by the first temperature measurement mechanism 103 to control the heater 104 so that the sensor chip 101 is heated to 150° C.

In a film deposition apparatus, a heater provided for a pipe unit is used to heat the surroundings of the pressure introduction pipe 204 to a predetermined temperature. The pipe unit extends mainly from a main chamber, and the pressure introduction pipe 204 is connected to the pipe unit. The pressure (vacuum level) inside the pipe unit is detected by using the sensor chip 101 of the pressure sensor. The pressure introduction pipe 204 was kept heated with the pipe-unit heater described above for a predetermined period of time until the temperature of the pressure introduction pipe 204 and the sensor characteristics of the sensor chip 101 became stable.

After the state became stable, zero point adjustment was performed on the pressure sensor. Subsequently, the temperature of the pressure introduction pipe 204 was decreased stepwise, and finally the operation of the pipe-unit heater was stopped. In the process of changing (decreasing) the temperature of the pressure introduction pipe 204 stepwise, the first temperature measurement mechanism 103 and the second temperature measurement mechanism 106 performed temperature measurement operations. In the temperature changing process described above, furthermore, the zero-point fluctuation of the temperature sensor was observed. In the state in which the operation of the pipe-unit heater was stopped, the temperature of the pressure introduction pipe 204 was approximately 60° C.

Figure 3:
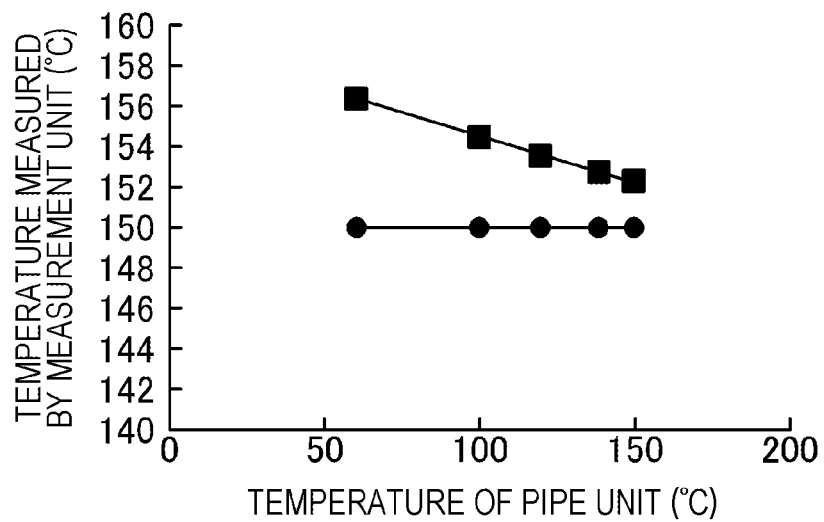
FIG. 3 is a characteristic diagram illustrating measurement results of a first temperature measurement mechanism and a second temperature measurement mechanism with respect to changes in the temperature of a pressure introduction pipe.
Figure 4:
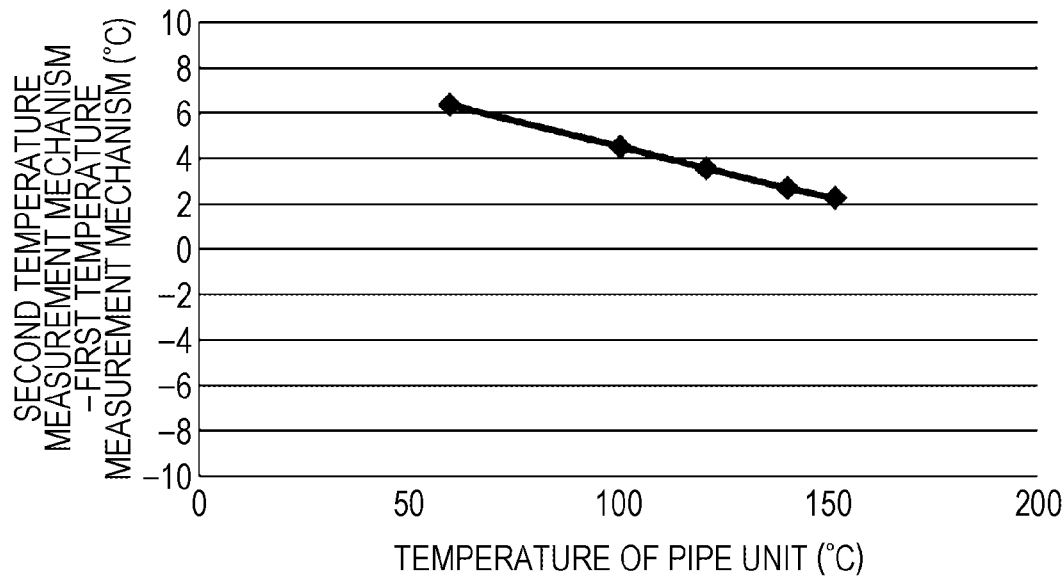
FIG. 4 is a characteristic diagram illustrating measurement results of a temperature difference obtained by a temperature difference calculation unit with respect to changes in the temperature of the pressure introduction pipe.
Figure 5:
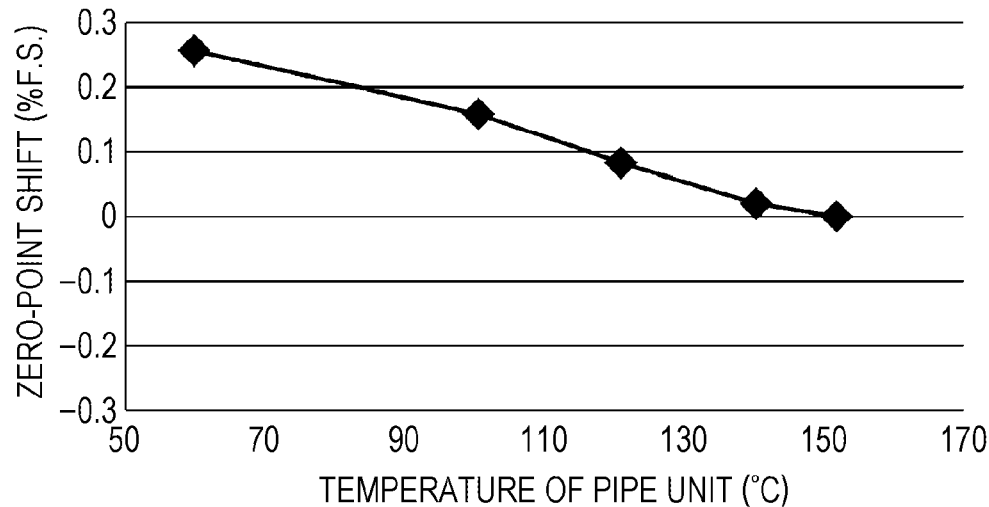
FIG. 5 is a characteristic diagram illustrating a zero-point fluctuation of the pressure sensor according to the embodiment with respect to temperature changes.
Figure 6:
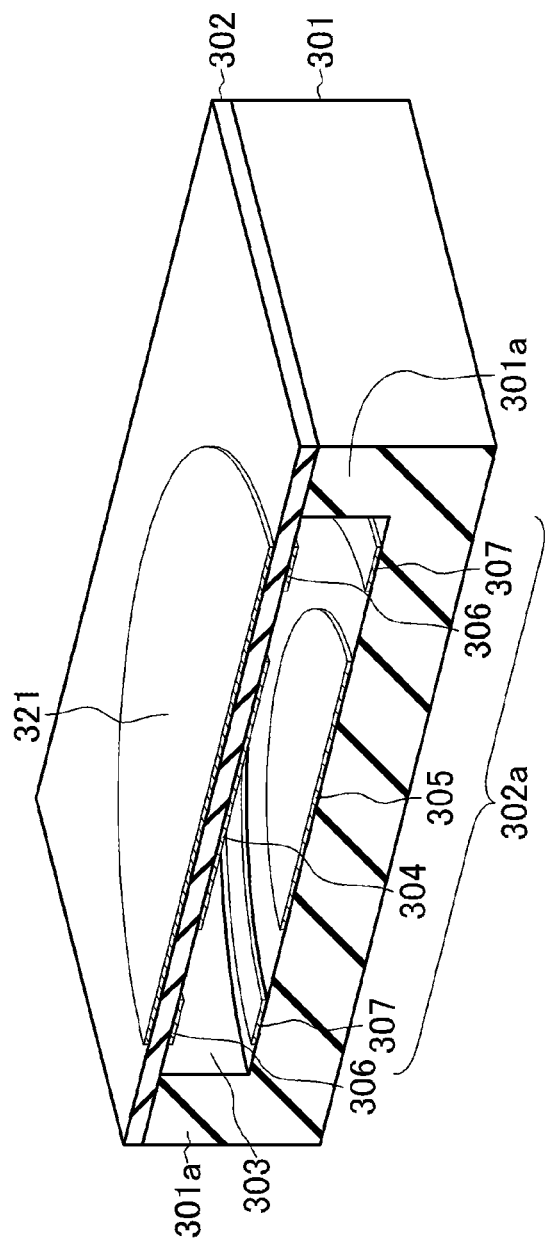
FIG. 6 is a perspective view of a portion of a detection device of a diaphragm gauge with a portion thereof broken away.

As a result of the experiment, as the temperature of the pressure introduction pipe 204 changes, as indicated by black circles in FIG. 3, the measurement results obtained by the first temperature measurement mechanism 103 match the changing temperatures of the pipe unit. In contrast, as indicated by black rectangles in FIG. 3, the temperature measurement results obtained by the second temperature measurement mechanism 106 do not match the changing temperatures of the pipe unit. In addition, as illustrated in FIG. 4, the measurement results of the temperature difference obtained by the temperature difference calculation unit 107 indicate an increase from approximately 2.2° C. to approximately 6.3° C. at 150° C. to 60° C. In addition, as illustrated in FIG. 5, the zero-point fluctuation (shift) due to the temperature change described above is approximately 0.25% F.S. As the temperature difference increases, the zero point shifts to the positive side.

The results described above indicate that the zero point shifts as the temperature of the pressure introduction pipe 204 fluctuates. Even when the temperature of the pressure introduction pipe 204 fluctuates, the pressure sensor controls the temperature of the sensor chip 101 to a set self-heating temperature and therefore the temperature value measured by the first temperature measurement mechanism 103 does not fluctuate. In contrast, the temperature measurement results of the second temperature measurement mechanism 106 reflect a change in the temperature of the pressure introduction pipe 204. Therefore, the temperature difference determined by the temperature difference calculation unit 107 reflects fluctuations in the temperature of the pressure introduction pipe 204.

As described above, fluctuations in the temperature of the pressure introduction pipe 204 cause a zero-point fluctuation. Accordingly, fluctuations in the temperature of the pressure introduction pipe 204 cause a deviation of the measured value to be output from the pressure sensor. However, the temperature fluctuations that cause the deviation of the measured value are reflected in the temperature difference determined by the temperature difference calculation unit 107. Thus, the occurrence of the deviation of the measured value can be determined on the basis of the temperature difference.

As described above, in an embodiment of the present disclosure, it is determined that fluctuations in heat transmission to a pressure introduction pipe occur due to a difference between a measurement result of a first temperature measurement mechanism configured to measure a temperature for self-heating control and a measurement result of a second temperature measurement mechanism disposed in contact with a heating mechanism for self-heating and configured to measure a temperature of the heating mechanism. Therefore, an embodiment of the present disclosure enables the detection of fluctuations of heat transmitted to a detection device of a pressure sensor from a pipe such as a pressure introduction pipe.

It is apparent that the present disclosure is not limited to the embodiment described above and a large number of modifications and combinations can be made by a person having ordinary knowledge about the field in question within the technical idea of the present disclosure. For example, in the foregoing description, a capacitance diaphragm gauge is taken as a non-limiting example. A piezoresistive pressure sensor that detects a displacement of a diaphragm as a piezoresistance change may also be available.

What is claimed is:

1. A pressure sensor comprising:
   a detection device including a diaphragm displaceable upon receipt of pressure from a measurement target, the detection device being configured to convert a displacement of the diaphragm into a change in another physical quantity;
   a pressure value output unit configured to convert the change in the other physical quantity obtained from the displacement of the diaphragm into a pressure value and output the pressure value;
   an inner container that accommodates the detection device;
   an outer container that accommodates the inner container;
   a pressure introduction pipe connected to the inner container and configured to introduce the pressure of the measurement target into the inner container;
   a partition wall disposed in the inner container, the partition wall separating an internal space of the inner container into a pressure-detection-side space and an element-arrangement-side space opposite the pressure-detection-side space,
      the pressure-detection-side space being a space into which the pressure of the measurement target is introduced through the pressure introduction pipe,
      the element-arrangement-side space being a space in which the detection device is disposed,
      the partition wall having the detection device joined to a surface thereof in the element-arrangement-side space,
      the partition wall having a pressure introduction hole through which pressure in the pressure-detection-side space is introduced to the diaphragm of the detection device;
   a first temperature measurement mechanism disposed on an outer wall surface of the inner container at a position corresponding to the element-arrangement-side space;
   a heating mechanism disposed outside the outer container and positioned on a wall surface of the outer container, the heating mechanism being configured to heat an inside of the outer container;
   a temperature control unit configured to control an operation of the heating mechanism such that a first temperature value measured by the first temperature measurement mechanism is close to a set temperature;
   a second temperature measurement mechanism configured to measure a temperature of the heating mechanism;
   a temperature difference calculation unit configured to determine a temperature difference between the first temperature value measured by the first temperature measurement mechanism and a second temperature value measured by the second temperature measurement mechanism; and
   an alert output unit configured to issue an alert when the temperature difference calculated by the temperature difference calculation unit falls outside a set range.

2. The pressure sensor according to claim 1, wherein the detection device further includes
   a base that supports the diaphragm with a space therebetween,
   a first electrode disposed on the diaphragm, and
   a second electrode disposed on the base and facing the first electrode, and
   wherein the pressure value output unit converts a capacitance change between the first electrode and the second electrode due to a displacement of the diaphragm into a pressure value and outputs the pressure value.

3. The pressure sensor according to claim 1, wherein the diaphragm includes a capacitance chamber opposite a pressure-receiving portion that receives the pressure from the measurement target, the capacitance chamber being in a vacuum.

* * * * *